Oct. 31, 1950     S. C. MOORE     2,528,474
SPRING LOADED TOOL JOINT DRESSING TOOL

Filed Oct. 22, 1945     3 Sheets-Sheet 1

STANLEY C. MOORE
INVENTOR

BY Lester B. Clark
ATTORNEY

Patented Oct. 31, 1950

2,528,474

UNITED STATES PATENT OFFICE 2,528,474

SPRING LOADED TOOL JOINT DRESSING TOOL

Stanley C. Moore, Houston, Tex., assignor to Hughes Tool Company, Houston, Tex., a corporation of Delaware Application October 22, 1945, Serial No. 623,811

2 Claims. (Cl. 90—12)

The invention relates to a spring loaded tool joint shoulder dressing tool. In the rotary method of drilling wells for the lengths or sections of drill pipe are coupled together with special type coupling known as tool joint. The coupling comprises a pin member and a box member which must be connected very tightly so as to prevent leakage of the drilling mud under high pressure being pumped through the drill pipe. Each of these members is therefore provided with an abutting shoulder which limits the making up of the threads between the tool joint pin and box members. These shoulders serve to transmit the torque applied to the drill pipe.

When the bit is to be changed or some other operation performed the drill pipe is withdrawn from the well and at least some of the sections of the tool joints uncoupled. The drill pipe is then stacked in the derrick and then re-coupled when the drill pipe is run back into the hole. It seems obvious that the shoulders of the tool joint may become deformed or incapable of maintaining a seal due to the tremendous torque and pressure applied to them and the fact that they may be bumped or knocked by various objects.

It is one of the objects of the invention therefore to provide a tool for re-dressing or re-finishing these shoulders while the tool joints are in the field or in the derrick, without transporting the drill stem to a shop or other location.

It is another object of the invention to provide a tool joint shoulder dressing tool wherein the dressing or abrading members are forced into active position or loaded by a spring.

Still another object of the invention is to load a tool joint shoulder dressing tool by adjusting a spring so as to apply a uniform pressure to the dressing members.

Still another object of the invention is to adapt a tool joint dressing tool for either the pin or the box shoulders of a tool joint in such a manner that the dressing members may be spring loaded.

Other and further objects of the invention will be readily apparent when the following description is considered in connection with the accompanying drawings wherein.

Figure 1:
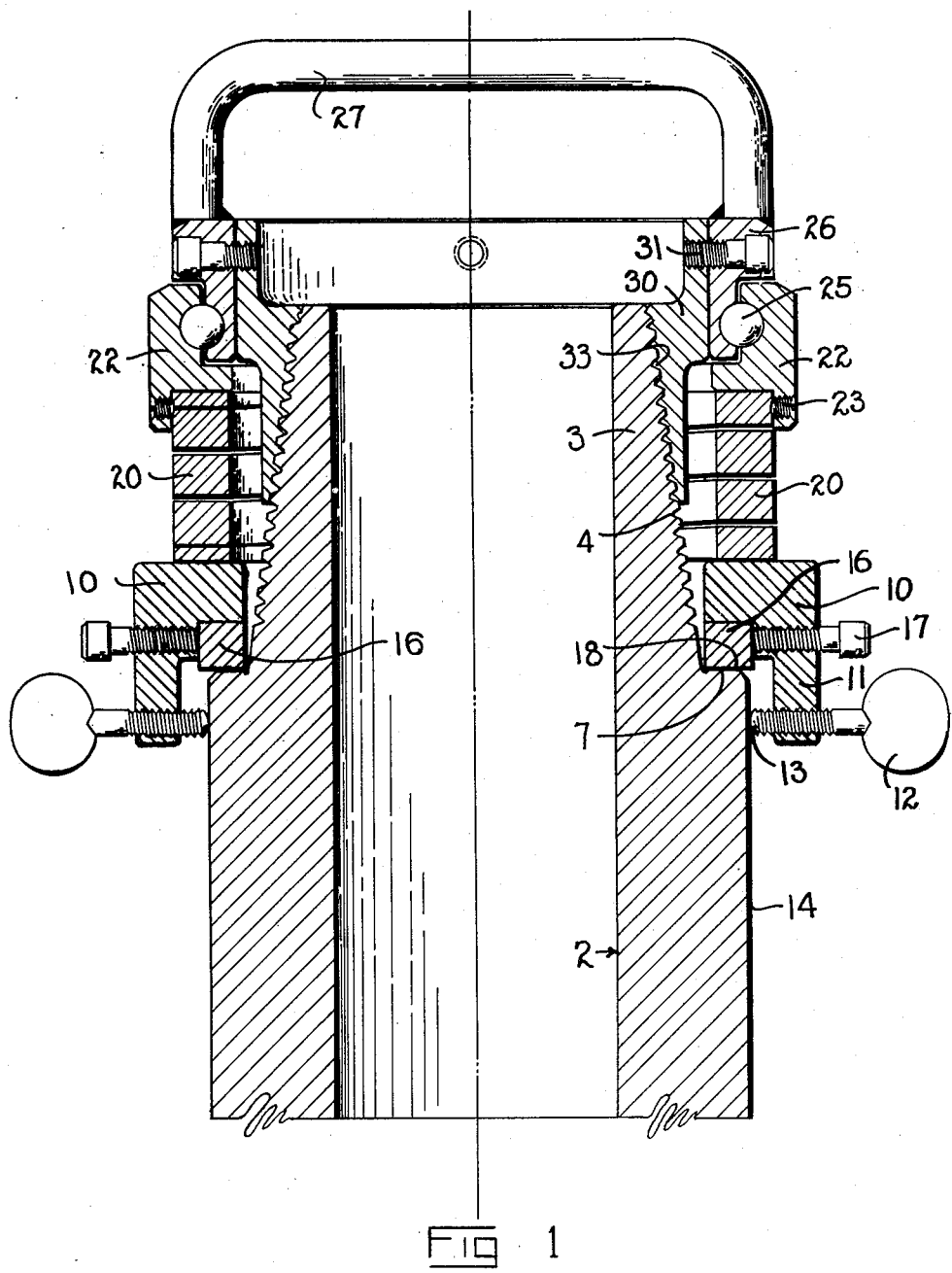
Fig. 1 is a vertical sectional view of a tool joint pin member with the spring loaded shoulder dressing tool applied thereto in position with the maximum compression of the spring being applied.
Figure 2:
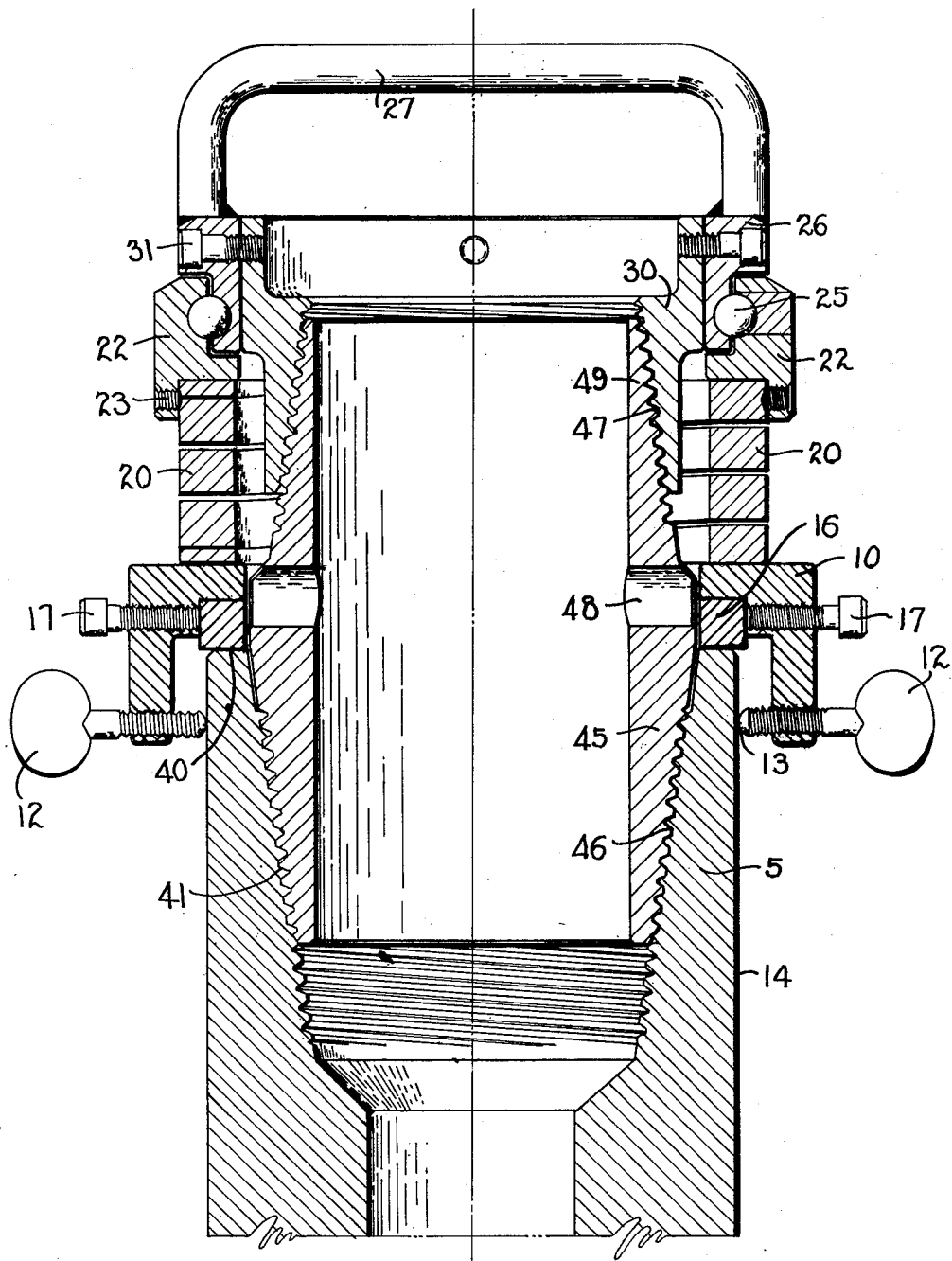
Fig. 2 is a view similar to Fig. 1 with the tool applied to the box member and illustrating an adapter member for supporting the tool.

In Fig. 1 the tool joint 2 has the pin member 3 thereon which is threaded at 4 for connection to a tool joint box member 5, such as shown in Fig. 2. A tool joint shoulder 7 on the pin member 3 is to be re-worked or dressed for the purpose of refinishing the shoulder. Such shoulder may have become deformed by the torque applied to the drill stem by pressure leaking through the threads 4 or by having been struck against some object. The shoulder 7 can be dressed more than once if desired but it has been found that a maximum of somewhat less than ⅛ of an inch may be dressed off of the shoulder before it becomes unserviceable.

Figure 3:
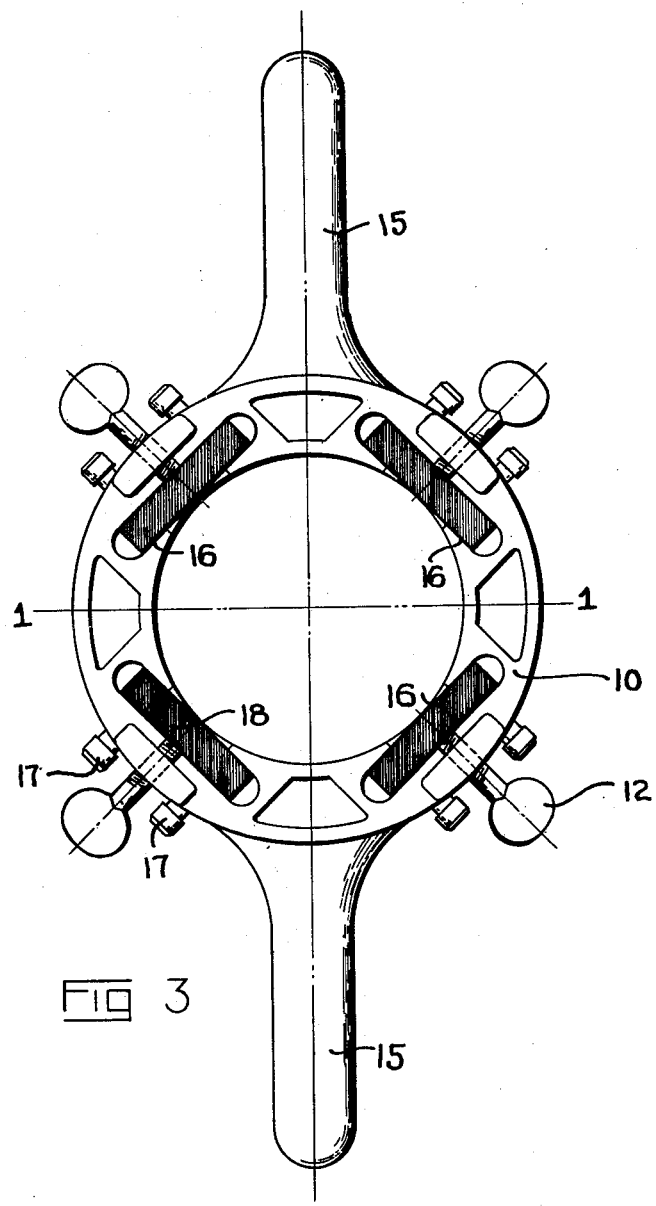
Fig. 3 is a bottom plan view looking up at the abrading or dressing members which engage the tool joint shoulder.

The dressing tool is made up of a body 10 which is in the form of an annular ring having downwardly extending flange 11 which may be carrying a plurality of guide screws 12. These screws are threaded through the flange so that the ends 13 thereof will abut the periphery 14 of the tool joint and cause the body 10 to be centered about the tool joint. This body is shown in plan view in Fig. 3 as having the handles 15 extending laterally therefrom. This ring carries a plurality of shoulder dressing members 16 which may be clamped in place by the set screws 17. These dressing members may be in the form of file segments having abrading faces 18 which abut the shoulder 7 to perform a re-finishing operation thereon. In order to force these abrading or dressing members against the shoulder 7 with a uniform action a spring 20 has been provided which is in the form of a relatively heavy coil spring having a short compressive movement.

This spring is in turn forced against the body 10 by the ring 22 in which the upper end of the spring is seated and retained by the set screws 23. The ring 22 carries a set of anti-friction bearings 25, which also ride in a sleeve 26 so that the ring 22, the spring 20 and the body 10 are all rotatable relative to the sleeve 26.

The sleeve 26 carries a handle 27 by which it may be moved and the tool carried about. This sleeve 26 is connected to an anchor collar 30 by means of the bolts 31 and the collar 30 in turn has a box thread 33 thereon which is arranged to fit the threads 4 on the pin 3.

While the thread 4 is a tapered thread nevertheless the collar 30 can be adjusted thereon to some extent sufficiently to vary the compression upon the spring 20, it being borne in mind that the total compression of the spring 20 probably will not exceed one-half an inch. Of course, the spring, thread and various parts can be so manufactured and arranged that the desired compression can be had.

In operation the tool may be placed over the tool joint and the collar 30 threaded into position by turning of the handle 27. This positions the abrading members 16 against the shoulder 7 and the handles 15 can now be grasped so as to rotate the body 10. While the abrading members 16 are forced against the shoulder with substantial pressure due to the spring 20, it has been found that the tool can be rotated quite readily and that the shoulder 7 can be in this manner quickly refinished. To remove the tool it is only necessary to unscrew the collar 30 from the threads 4.

The collar 30 may not be made up on the threads 4 to the extent shown in Fig. 1 unless the maximum compression on the spring 20 is desired. In this manner adjustment of the load applied to the spring can be obtained.

The tool of Fig. 2 is identical to that previously described except that the shoulder 40 being finished is the shoulder on the box member 5. The threads 41 in the box member are shown as receiving an adapter bushing 45 which has the opposite pin threads 46 and 47 thereon. This adapter can be screwed into place in the box 41 by placing a suitable rod or instrument in the openings 48.

When this adapter is in place a pin member 49 is extending upwardly to receive the collar 30 the same as described in connection with the pin 3 of Fig. 1.

With this adapter 45 it is possible to utilize identically the same tool for re-finishing the shoulder on the pin and the box of a tool joint.

Broadly the invention contemplates a spring loaded tool joint shoulder dressing tool wherein a uniform pressure is applied to the dressing members.

What is claimed as new is:

1. A spring loaded tool joint shoulder dressing tool including, an annular body, shoulder dressing means on one face thereof, said body being adapted to rotatively overlie, and the dressing means thereon to engage, the shoulder to be dressed, a downwardly extending portion on said body displaced outwardly from the inner surface of the body, adjustable contact means extending inwardly from said downwardly extending portion to adjustably position the body for rotation upon tool joint having a shoulder to be dressed, a compression spring coaxial with and resting upon said body opposite the dressing means, a collar coaxial with said spring and body and threaded to be adjustably positioned upon a tool joint, a ring rotatably mounted upon said collar and engaging said spring, and means on said annular body to apply rotative effort thereto to rotate the body, spring and collar, whereby said means effects dressing action upon the underlying shoulder of a tool joint.

2. A spring loaded tool joint shoulder dressing tool including, an annular body, dressing means on the lower face thereof, ears on the body extending downwardly beyond the surface of the dressing means, guide screws passing through said ears to adjustably position the body for rotation upon a tool joint having a shoulder to be dressed, a compression spring coaxial, with and resting upon said body opposite the dressing means, a collar coaxial with said spring and body and threaded to be adjustably positioned upon a tool joint, a ring rotatably mounted upon said collar and engaging said spring, and means on said annular body to apply rotative effort thereto to rotate the body, spring and collar, whereby said means effects dressing action upon the underlying shoulder of a tool joint.

STANLEY C. MOORE.

REFERENCES CITED

The following references are of record in the file of this patent:

UNITED STATES PATENTS

| Number | Name | Date |
|---|---|---|
| 235,373 | Miller | Dec. 14, 1880 |
| 353,485 | Donnally | Nov. 30, 1886 |
| 584,439 | Wiehl | June 15, 1897 |
| 913,089 | Ankarlo | Feb. 23, 1909 |
| 1,412,058 | Johnson | Apr. 11, 1922 |
| 1,526,950 | Bartley | Feb. 17, 1925 |
| 1,934,729 | Monckmeier | Nov. 14, 1933 |
| 2,106,201 | Aab | Jan. 25, 1938 |